(12) United States Patent
Olaleye et al.

(10) Patent No.: US 11,382,203 B2
(45) Date of Patent: Jul. 5, 2022

(54) SYSTEMS, METHODS, AND APPARATUSES FOR DISTRIBUTING COMPUTATIONAL RESOURCES OVER A NETWORK OF LUMINAIRES

(71) Applicant: SIGNIFY HOLDING B.V., Eindhoven (NL)

(72) Inventors: Olaitan Philip Olaleye, Wakefield, MA (US); Abhishek Murthy, Arlington, MA (US)

(73) Assignee: SIGNIFY HOLDING B.V., Eindhoven (NL)

( * ) Notice: Subject to any disclaimer, the term of this patent is extended or adjusted under 35 U.S.C. 154(b) by 567 days.

(21) Appl. No.: 16/334,660

(22) PCT Filed: Sep. 19, 2017

(86) PCT No.: PCT/EP2017/073614
§ 371 (c)(1),
(2) Date: Mar. 19, 2019

(87) PCT Pub. No.: WO2018/054893
PCT Pub. Date: Mar. 29, 2018

(65) Prior Publication Data
US 2021/0298157 A1 Sep. 23, 2021

Related U.S. Application Data

(60) Provisional application No. 62/399,327, filed on Sep. 23, 2016.

(30) Foreign Application Priority Data

Sep. 5, 2016 (EP) .................................. 16202267

(51) Int. Cl.
*H05B 47/155* (2020.01)
*H05B 47/175* (2020.01)
(Continued)

(52) U.S. Cl.
CPC ....... *H05B 47/175* (2020.01); *H04L 12/2803* (2013.01); *H05B 47/125* (2020.01); *H05B 47/155* (2020.01); *H05B 47/19* (2020.01)

(58) Field of Classification Search
CPC .. H05B 47/155; H05B 47/125; H05B 47/175; H05B 47/105; H05B 47/18; H05B 47/19;
(Continued)

(56) References Cited

U.S. PATENT DOCUMENTS

| 6,016,038 A | 1/2000 | Mueller et al. |
| 6,211,626 B1 | 4/2001 | Lys et al. |

(Continued)

FOREIGN PATENT DOCUMENTS

| CN | 102341986 A | 2/2012 |
| CN | 103106553 A | 5/2013 |

(Continued)

*Primary Examiner* — Haissa Philogene
(74) *Attorney, Agent, or Firm* — Daniel J. Piotrowski

(57) ABSTRACT

The described embodiments relate to systems, methods, and apparatus for employing a network (410) of smart luminaires (402, 440) to perform tasks typically reserved for remote servers. The network of smart luminaires can include lighting elements for illuminating an area, as well as a computer system for processing and transmitting data. Various computational tasks can be parsed and delegated to certain smart luminaires in the network (410) in order to optimize the use of each smart luminaire in the network. Computational tasks can originate at the smart luminaires or be delegated to the smart luminaires by another device. Additionally, data that is processed by the smart luminaires can be transmitted to other devices, thereby allowing other devices to leverage the computing power of a nearby network of smart luminaires.

11 Claims, 7 Drawing Sheets

(51) Int. Cl.
*H05B 47/125* (2020.01)
*H05B 47/19* (2020.01)
*H04L 12/28* (2006.01)

(58) Field of Classification Search
CPC .............. H05B 47/115; H04L 12/2803; H04L 12/2814; H04L 67/125; Y02B 20/40
See application file for complete search history.

(56) References Cited

U.S. PATENT DOCUMENTS

| | | | |
|---|---|---|---|
| 9,137,879 | B2 | 9/2015 | Rains et al. |
| 9,572,230 | B2 * | 2/2017 | Reed ...................... H05B 47/16 |
| 9,629,226 | B2 * | 4/2017 | Aggarwal ............ H04B 10/116 |
| 2007/0162748 | A1 | 7/2007 | Okayama et al. |
| 2011/0153738 | A1 | 6/2011 | Bedingfield |
| 2014/0035482 | A1 | 2/2014 | Rains et al. |
| 2014/0346969 | A1 | 11/2014 | Hinrichs |
| 2015/0042240 | A1 | 2/2015 | Aggarwal et al. |
| 2015/0324185 | A1 | 11/2015 | Boehnel et al. |
| 2016/0019053 | A1 | 1/2016 | Gambardella et al. |
| 2016/0036484 | A1 | 2/2016 | Sullivan et al. |
| 2016/0094811 | A1 | 3/2016 | Renkis |
| 2017/0027045 | A1 * | 1/2017 | Chemel .................. H05B 45/10 |
| 2019/0242539 | A1 * | 8/2019 | Roberts .................. F21S 8/006 |
| 2021/0067440 | A1 * | 3/2021 | Rodinger ............... H05B 47/19 |
| 2022/0070982 | A1 * | 3/2022 | Hussell .................. H05B 47/19 |

FOREIGN PATENT DOCUMENTS

| | | |
|---|---|---|
| CN | 103583029 A | 2/2014 |
| CN | 105183695 A | 12/2015 |
| CN | 105864664 A | 8/2016 |
| JP | 2012018880 | 1/2012 |
| JP | 2012525673 | 10/2012 |
| JP | 2016509738 | 3/2016 |
| WO | 2013114720 A1 | 8/2013 |

* cited by examiner

SYSTEMS, METHODS, AND APPARATUSES FOR DISTRIBUTING COMPUTATIONAL RESOURCES OVER A NETWORK OF LUMINAIRES

CROSS-REFERENCE TO PRIOR APPLICATIONS

This application is the U.S. National Phase application under 35 U.S.C. § 371 of International Application No. PCT/EP2017/073614, filed on Sep. 19, 2017 which claims the benefit of U.S. Provisional Patent Application No. 62/399,327, filed on Sep. 23, 2016, and European Patent Application No. 16202267.7. These applications are hereby incorporated by reference herein.

TECHNICAL FIELD

The present invention is directed generally to systems, methods, and apparatuses for optimizing network resources. More particularly, various inventive methods and apparatuses disclosed herein relate to employing network of luminaires to perform computational tasks.

BACKGROUND

Digital lighting technologies, i.e., illumination based on semiconductor light sources, such as light-emitting diodes (LEDs), offer a viable alternative to traditional fluorescent, HID, and incandescent lamps. Functional advantages and benefits of LEDs include high energy conversion and optical efficiency, durability, lower operating costs, and many others. Recent advances in LED technology have provided efficient and robust full-spectrum lighting sources that enable a variety of lighting effects in many applications. Some of the fixtures embodying these sources feature a lighting module, including one or more LEDs capable of producing different colors, e.g., red, green, and blue, as well as a processor for independently controlling the output of the LEDs in order to generate a variety of colors and color-changing lighting effects, for example, as discussed in detail in U.S. Pat. Nos. 6,016,038 and 6,211,626, incorporated herein by reference.

Certain technologies offer the ability to off load computational tasks to a remote server in order to conserve available resources at local devices. Although remote servers can offer additional processing power, the task of off-loading can consume bandwidth and cause delays for other network traffic. Furthermore, remote servers that manage a variety of accounts can have longer wait times for queries to be received. Therefore, any resolution to a query or processing task may be further delayed by offloading the task to a remote server.

US 20150042240 A1 relates to a lighting system utilizes intelligent system elements, such as lighting devices, user interfaces for lighting control or the like and possibly sensors. The system also has a data communication network. Some number of the intelligent lighting system elements, including at least two of the lighting devices, also support communication with non-lighting-system devices at the premises. Each such element has a communication interface system configured to provide a data communication link for use by non-lighting-system devices at the premises in proximity to the respective intelligent system element. Also, in such an element, the processor is configured to control communications via the communication interface system so as to provide access to the data network and through the data network to the wide area network outside the premises for non-lighting related communications of the non-lighting-system devices.

US 20140035482 A1 relates to a system of network-connected lighting devices also offers a distributed processing function that utilizes processor and/or memory resources if/when available in some or all of the lighting devices. In the examples, a resource manager receives a job for distributed processing using shared available resources. The resource manager identifies lighting devices having resources of the processors and/or the memories available for the distributed processing function. The resource manager distributes tasks and/or data of the received job through a communications network to identified lighting devices, for distributed processing. The resource manager also receives results of distributed processing for the received job, from the identified lighting devices through the communications network. The received results are processed to produce a composite result for a response to the received job.

SUMMARY

The present disclosure is directed to systems, methods, and apparatus for leveraging the processing power of a network of smart luminaire devices to perform computationally intensive tasks without the need to offload the tasks to remote servers. For example, a network of luminaire devices can perform imaging processing tasks on images taken in an area illuminated by the luminaire devices by parsing the image into segments and distributing the segmented images among the individual luminaire devices for processing.

Generally, in one aspect, a method is set forth for performing a computational task using a network of lighting apparatuses. The method can be performed by a lighting apparatus in the network of lighting apparatuses, or any device or apparatus discussed herein. The method can include the steps of: receiving task schedules from lighting apparatuses in the network of lighting apparatuses; determining, based on the task schedules, an amount of computational resources available from the lighting apparatuses; and determining an occupancy pattern of a room illuminated by at least one lighting apparatus in the network of lighting apparatuses. The method can also include the step of: identifying a subgroup of lighting apparatuses in the network of lighting apparatuses that have available computational resources, wherein identifying the subgroup of lighting apparatuses is at least partially based on the occupancy pattern of the room. The steps can also include distributing the computational task to the subgroup of lighting apparatuses in the network of lighting apparatuses. The occupancy pattern can be determined using one or more cameras installed in one or more lighting apparatuses in the network of lighting apparatuses. The method can also include a step of receiving energy usage data from the lighting apparatuses in the network of lighting apparatuses, wherein distributing the computational task to the subgroup is at least partially based on the received energy usage data. The method can further include a step of determining a connectivity requirement for distributing the computational task to the subgroup of lighting apparatuses in the network of lighting apparatuses. Additionally, the method can include a step of parsing the computational task into subtasks at least partially based on the connectivity requirement for distributing the computational task, wherein distributing the computational task includes distributing the subtasks. The method can also include steps of determining that a fault has occurred at a subgroup lighting apparatus; and redistributing a subtask from the subgroup lighting apparatus to a different subgroup lighting apparatus.

In another aspect, a lighting apparatus is set forth. The lighting apparatus can include a lighting unit, and a wireless transceiver configured to connect to a wireless lighting network. The lighting apparatus can also include a sensor configured to transmit a signal based on environmental conditions illuminated by the lighting unit, and a processor connected to the sensor, the wireless transceiver, and the lighting unit. The processor can be configured to (i) receive the signal from the sensor, (ii) parse the signal into segmented data for distribution by the wireless transceiver over the wireless lighting network, and (iii) receive, from an affiliated lighting apparatus connected to the wireless lighting network, processed data based on the segmented data distributed by the wireless transceiver. The sensor can be a camera and the segmented data can be image data. The processor can be further configured to control the lighting unit based on the processed data received from the affiliated lighting apparatus. The lighting apparatus can further include a memory device that stores a program for analyzing program data received from the affiliated lighting apparatus, wherein the wireless transceiver is further configured to transmit the program data to the affiliated lighting apparatus. The memory device can also store a network protocol for communicating with the affiliated lighting apparatus over the wireless lighting network. The network protocol can be configured for wireless communications over a network consisting of multiple affiliated lighting apparatuses.

In yet another aspect, a non-transitory computer-readable medium is set forth as storing instructions that can be executed by one or more processors of a computing device. The execution of the instructions can cause the computing device to perform steps that include: receiving, from a lighting apparatus in a network of connected lighting apparatuses, charge data that indicates a battery charge level of the lighting apparatus, and identifying, at least partially based on the charge data received from the lighting apparatus, a subgroup of lighting apparatuses to perform a computational task. The steps can also include parsing the computational task into subtasks to be performed by individual lighting apparatuses, and transmitting, to the individual lighting apparatuses, data corresponding to the subtasks. The steps can further include determining that the battery charge level is within a low threshold stored by the computing device, wherein the lighting apparatus is excluded from the subgroup based on the battery charge level being within the low threshold. The steps can also include causing at least one lighting apparatus in the network of lighting apparatuses to share battery charge data with the lighting apparatus excluded from the subgroup. Additionally, the steps can include determining that the battery charge level is within a high threshold stored by the computing device, wherein the lighting apparatus is included in the subgroup based on the battery charge level being within the high threshold. The steps can also include determining that the computational task is complete; receiving an updated battery charge level from the lighting apparatus; and determining an amount of charge consumed by the lighting apparatus as a result of performing the task. Furthermore, the steps can include collecting environmental data using a sensor of the computing device; parsing the collected environmental data into subsets of collected data; and transmitting, to the individual lighting apparatuses, the subsets of collected data with the data corresponding to the subtasks. The computational task includes determining whether motion has occurred in an environment illuminated by the network of connected lighting apparatuses.

As used herein for purposes of the present disclosure, the term "LED" should be understood to include any electroluminescent diode or other type of carrier injection/junction-based system that is capable of generating radiation in response to an electric signal. Thus, the term LED includes, but is not limited to, various semiconductor-based structures that emit light in response to current, light emitting polymers, organic light emitting diodes (OLEDs), electroluminescent strips, and the like. In particular, the term LED refers to light emitting diodes of all types (including semi-conductor and organic light emitting diodes) that may be configured to generate radiation in one or more of the infrared spectrum, ultraviolet spectrum, and various portions of the visible spectrum (generally including radiation wavelengths from approximately 400 nanometers to approximately 700 nanometers). Some examples of LEDs include, but are not limited to, various types of infrared LEDs, ultraviolet LEDs, red LEDs, blue LEDs, green LEDs, yellow LEDs, amber LEDs, orange LEDs, and white LEDs (discussed further below). It also should be appreciated that LEDs may be configured and/or controlled to generate radiation having various bandwidths (e.g., full widths at half maximum, or FWHM) for a given spectrum (e.g., narrow bandwidth, broad bandwidth), and a variety of dominant wavelengths within a given general color categorization.

For example, one implementation of an LED configured to generate essentially white light (e.g., a white LED) may include a number of dies which respectively emit different spectra of electroluminescence that, in combination, mix to form essentially white light. In another implementation, a white light LED may be associated with a phosphor material that converts electroluminescence having a first spectrum to a different second spectrum. In one example of this implementation, electroluminescence having a relatively short wavelength and narrow bandwidth spectrum "pumps" the phosphor material, which in turn radiates longer wavelength radiation having a somewhat broader spectrum.

It should also be understood that the term LED does not limit the physical and/or electrical package type of an LED. For example, as discussed above, an LED may refer to a single light emitting device having multiple dies that are configured to respectively emit different spectra of radiation (e.g., that may or may not be individually controllable). Also, an LED may be associated with a phosphor that is considered as an integral part of the LED (e.g., some types of white LEDs). In general, the term LED may refer to packaged LEDs, non-packaged LEDs, surface mount LEDs, chip-on-board LEDs, T-package mount LEDs, radial package LEDs, power package LEDs, LEDs including some type of encasement and/or optical element (e.g., a diffusing lens), etc.

The term "light source" should be understood to refer to any one or more of a variety of radiation sources, including, but not limited to, LED-based sources (including one or more LEDs as defined above), incandescent sources (e.g., filament lamps, halogen lamps), HID, HPS, fluorescent sources, phosphorescent sources, high-intensity discharge sources (e.g., sodium vapor, mercury vapor, and metal halide lamps), lasers, other types of electroluminescent sources, pyro-luminescent sources (e.g., flames), candle-luminescent sources (e.g., gas mantles, carbon arc radiation sources), photo-luminescent sources (e.g., gaseous discharge sources), cathode luminescent sources using electronic satiation, galvano-luminescent sources, crystallo-luminescent sources, kine-luminescent sources, thermo-luminescent sources, triboluminescent sources, sonoluminescent sources, radioluminescent sources, and luminescent polymers.

A given light source may be configured to generate electromagnetic radiation within the visible spectrum, outside the visible spectrum, or a combination of both. Hence, the terms "light" and "radiation" are used interchangeably herein. Additionally, a light source may include as an integral component one or more filters (e.g., color filters), lenses, or other optical components. Also, it should be understood that light sources may be configured for a variety of applications, including, but not limited to, indication, display, and/or illumination. An "illumination source" is a light source that is particularly configured to generate radiation having a sufficient intensity to effectively illuminate an interior or exterior space. In this context, "sufficient intensity" refers to sufficient radiant power in the visible spectrum generated in the space or environment (the unit "lumens" often is employed to represent the total light output from a light source in all directions, in terms of radiant power or "luminous flux") to provide ambient illumination (i.e., light that may be perceived indirectly and that may be, for example, reflected off of one or more of a variety of intervening surfaces before being perceived in whole or in part).

The term "spectrum" should be understood to refer to any one or more frequencies (or wavelengths) of radiation produced by one or more light sources. Accordingly, the term "spectrum" refers to frequencies (or wavelengths) not only in the visible range, but also frequencies (or wavelengths) in the infrared, ultraviolet, and other areas of the overall electromagnetic spectrum. Also, a given spectrum may have a relatively narrow bandwidth (e.g., a FWHM having essentially few frequency or wavelength components) or a relatively wide bandwidth (several frequency or wavelength components having various relative strengths). It should also be appreciated that a given spectrum may be the result of a mixing of two or more other spectra (e.g., mixing radiation respectively emitted from multiple light sources).

For purposes of this disclosure, the term "color" is used interchangeably with the term "spectrum." However, the term "color" generally is used to refer primarily to a property of radiation that is perceivable by an observer (although this usage is not intended to limit the scope of this term). Accordingly, the terms "different colors" implicitly refer to multiple spectra having different wavelength components and/or bandwidths. It also should be appreciated that the term "color" may be used in connection with both white and non-white light.

The term "color temperature" generally is used herein in connection with white light, although this usage is not intended to limit the scope of this term. Color temperature essentially refers to a particular color content or shade (e.g., reddish, bluish) of white light. The color temperature of a given radiation sample conventionally is characterized according to the temperature in degrees Kelvin (K) of a black body radiator that radiates essentially the same spectrum as the radiation sample in question. Black body radiator color temperatures generally fall within a range of approximately 700 degrees K (typically considered the first visible to the human eye) to over 10,000 degrees K; white light generally is perceived at color temperatures above 1500-2000 degrees K.

Lower color temperatures generally indicate white light having a more significant red component or a "warmer feel," while higher color temperatures generally indicate white light having a more significant blue component or a "cooler feel." By way of example, fire has a color temperature of approximately 1,800 degrees K, a conventional incandescent bulb has a color temperature of approximately 2848 degrees K, early morning daylight has a color temperature of approximately 3,000 degrees K, and overcast midday skies have a color temperature of approximately 10,000 degrees K. A color image viewed under white light having a color temperature of approximately 3,000 degree K has a relatively reddish tone, whereas the same color image viewed under white light having a color temperature of approximately 10,000 degrees K has a relatively bluish tone.

The term "lighting fixture" is used herein to refer to an implementation or arrangement of one or more lighting units in a particular form factor, assembly, or package. The term "lighting unit" is used herein to refer to an apparatus including one or more light sources of same or different types. A given lighting unit may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry) relating to the operation of the light source(s). An "LED-based lighting unit" refers to a lighting unit that includes one or more LED-based light sources as discussed above, alone or in combination with other non LED-based light sources. A "multi-channel" lighting unit refers to an LED-based or non LED-based lighting unit that includes at least two light sources configured to respectively generate different spectrums of radiation, wherein each different source spectrum may be referred to as a "channel" of the multi-channel lighting unit.

The term "controller" is used herein generally to describe various apparatus relating to the operation of one or more light sources. A controller can be implemented in numerous ways (e.g., such as with dedicated hardware) to perform various functions discussed herein. A "processor" is one example of a controller, which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

The term "addressable" is used herein to refer to a device (e.g., a light source in general, a lighting unit or fixture, a controller or processor associated with one or more light sources or lighting units, other non-lighting related devices, etc.) that is configured to receive information (e.g., data) intended for multiple devices, including itself, and to selectively respond to particular information intended for it. The term "addressable" often is used in connection with a networked environment (or a "network," discussed further below), in which multiple devices are coupled together via some communications medium or media.

In one network implementation, one or more devices coupled to a network may serve as a controller for one or more other devices coupled to the network (e.g., in a master/slave relationship). In another implementation, a networked environment may include one or more dedicated controllers that are configured to control one or more of the devices coupled to the network. Generally, multiple devices coupled to the network each may have access to data that is present on the communications medium or media; however, a given device may be "addressable" in that it is configured to selectively exchange data with (i.e., receive data from and/or transmit data to) the network, based, for example, on one or more particular identifiers (e.g., "addresses") assigned to it.

The term "network" as used herein refers to any interconnection of two or more devices (including controllers or processors) that facilitates the transport of information (e.g., for device control, data storage, data exchange, etc.) between any two or more devices and/or among multiple devices coupled to the network. As should be readily appreciated, various implementations of networks suitable for interconnecting multiple devices may include any of a variety of network topologies and employ any of a variety of communication protocols. Additionally, in various networks according to the present disclosure, any one connection between two devices may represent a dedicated connection between the two systems, or alternatively a non-dedicated connection. In addition to carrying information intended for the two devices, such a non-dedicated connection may carry information not necessarily intended for either of the two devices (e.g., an open network connection). Furthermore, it should be readily appreciated that various networks of devices as discussed herein may employ one or more wireless, wire/cable, and/or fiber optic links to facilitate information transport throughout the network.

The term "user interface" as used herein refers to an interface between a human user or operator and one or more devices that enables communication between the user and the device(s). Examples of user interfaces that may be employed in various implementations of the present disclosure include, but are not limited to, switches, potentiometers, buttons, dials, sliders, a mouse, keyboard, keypad, various types of game controllers (e.g., joysticks), track balls, display screens, various types of graphical user interfaces (GUIs), touch screens, microphones and other types of sensors that may receive some form of human-generated stimulus and generate a signal in response thereto.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Figure 1:
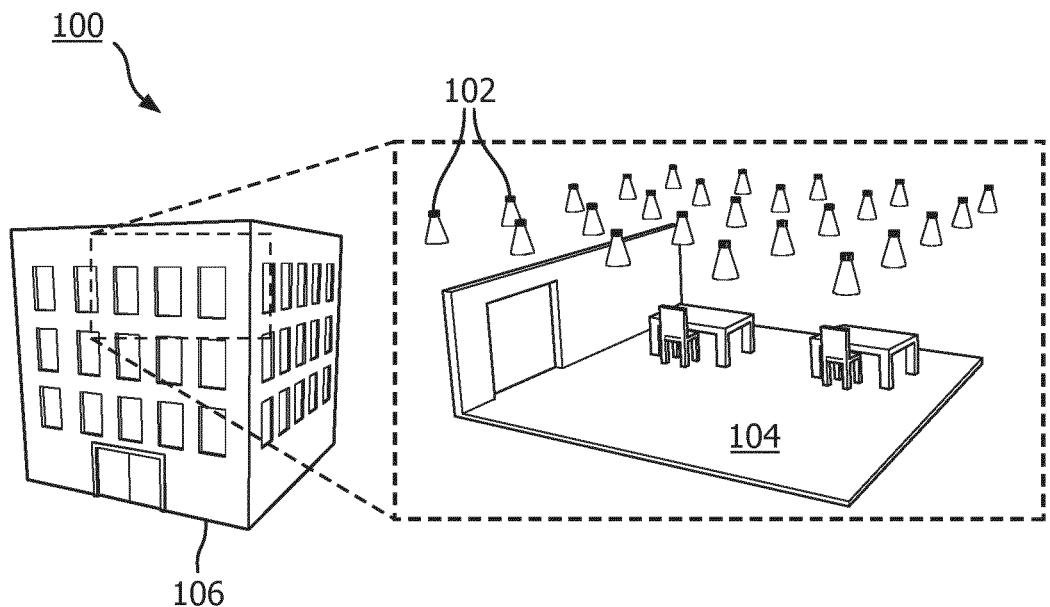
FIG. 1 illustrates an example of a network of luminaires connected within a building.

The described embodiments relate to employing a network of smart luminaires to perform computational tasks. Resource allocation in networks can typically rely on remote servers to perform computational tasks. Although, such remote servers can provide temporary relief to local networks that have limited bandwidth for handling computational tasks, the use of remote servers can cause latency at both the local network and remote server. The embodiments set forth herein aimed at leveraging and optimizing the computational power and/or non-computational resources (e.g., battery power) of local network devices. The local network devices can include smart luminaires, which can include lighting device that each have a lighting unit and a computer system. The computer system can include network capabilities that enable the lighting device to communicate wirelessly with other light lighting devices and share data with the other lighting devices. As a result, computationally intensive tasks can be parsed and distributed across lighting devices in order to avoid employing, or reduce the reliance on, a remote server to accomplish the tasks.

A network of smart luminaires can handle a variety of tasks that can originate at the luminaires and/or at a remote device and be pushed to the luminaires. For example, each luminaire can have a computing system that includes a sensor for perceiving environmental changes in areas illuminated by the luminaire. The sensor of a luminaire can collect data about the environment of the luminaire and the computing system can segment the data into smaller sets of data for processing by other luminaires in the network. For example, the sensor can be a camera that is tasked with tracking the movement of people in a building, and the computer system of the luminaire can use the data from the camera to identify and count the number of people in an area of the building at a given time, and identify occupancy patterns for certain rooms in the building. However, because the computational requirements for the images can be more than that of a single computer system of a luminaire, the computer system can segment the image load and transmit the segmented image data to other luminaires in the network in order to expedite the image processing task.

In some embodiments, the sensor can be a remote device relative to a network of smart luminaires. For example, the sensor can collect data about an environment of the sensor and transmit the collected data to the network of luminaires for processing. The network of luminaires can then return processed data to the sensor. In this way, the sensor can avoid sending the collected data over public networks, such as the internet, and improve processing times by leveraging the processing power of local devices. For example, the network of smart luminaires can be connected in an inventory warehouse, and the sensor can be setup to identify shipments that are entering or leaving the inventory warehouse. Because shipment operations may require the sensor to constantly observe the inventory warehouse, shipment identification can be improved by offloading sensor data analysis to the network of smart luminaires. Furthermore, illumination of the inventory warehouse can be adjusted according to the sensor data received by the network of luminaires, thereby potentially cutting energy costs for the inventory warehouse.

In some embodiments, the network of luminaires can be tasked with pre-processing data before the data is sent to a remote server. Each luminaire of the network of luminaires can include a computer system that contains software for performing data processing tasks such as compression, segmentation, and/or analysis. However, in some embodiments, such software can be pushed to the luminaires by separate device. Pre-processing tasks such as compression can be useful for reducing the amount of data required to be sent to a remote server for further processing. For example, a remote server can be tasked with performing facial recognition on images provided to the remote server from a local device that is also connected to the network of luminaires. However, before the local device sends the images to the remote server, the local device can send the images to the network of luminaires for compression or other pre-processing (e.g., removing background image data and leaving foreground image data). Once pre-processing by the network of luminaires has completed, the network of luminaires can transmit the pre-processed image data back to the local device, and the local device can send the pre-processed image data to the remote server. By sending the pre-processed image data to the remote server instead of the non-processed image data, substantial bandwidth can be conserved thereby allowing other network processes to execute more efficiently.

In some embodiments, a subgroup of luminaires in a network of luminaires can be selected for computational tasks instead of the entire network of luminaires, in order to more evenly spread the computational resources across the network of luminaires. Each luminaire can include a computer system with a memory that stores the specifications of the luminaire in order that the luminaire can strategize how to best accomplish a computational task. For example, a luminaire in the network of luminaires can calculate a total amount of random access memory (RAM) available in a network of luminaires by summing the RAM sizes for each luminaire in the network of luminaires. If a processing task involves compressing an image, then depending on the size of the image, the luminaire can calculate the number of luminaires to task with compressing the image. Furthermore, a luminaire can store specifications regarding the bandwidth of the network of luminaires and determine paths of least resistance or least network traffic for sending and receiving data over the network of luminaires. For example, a luminaire can store a location of each luminaire on the network of luminaires and determine the computational resources involved in sending data to the various luminaires in the network of luminaires. In this way, the luminaire can avoid sending smaller computational tasks to more distant luminaires because such transmissions would consume computational resources of other luminaires in the network along the way. In some embodiments, the network of luminaires can be powered by a battery source, therefore reducing computational resources can also conserve charge for the battery. Furthermore, each luminaire can calculate an estimate of power cost for a luminaire to transmit and complete a computational task, and therefore avoid transmitting computational tasks to too many luminaires at a time in order to conserver power. By allowing the luminaires to calculate the available computational and non-computational resources to perform a task, the need for middleware is eliminated. This allows for tasks such as computing available network battery power to be performed exclusively within the network of luminaires in order to avoid wasting resources on sending and receiving data to and from external devices.

Referring to FIG. 1, a diagram 100 is illustrated to provide an example of a network of luminaires 102 in a building 106 that includes multiple floors 104. The network of luminaires 102 can be included on multiple different floors 104 of the building 106. Additionally, each luminaire 102 can be capable of communicating directly or indirectly with every other luminaire 102 in order that the luminaires can share data over multiple areas and floors 104 of the building 106. Each luminaire 102 can be a smart luminaire, and therefore have both a lighting unit and a computer system (i.e., a controller) for performing computational tasks. The network of luminaires 102 can collect data and/or perform processing tasks for improving the operations that occur in and out of the building 106. For example, the building 106 can be an office building and the lighting of the office building can be made dynamic according to identified occupancy patterns of persons in rooms within the office building. The occupancy patterns of persons within the building can be determined or predicted by the network of luminaires 102. In some embodiments, the building 106 can be an inventory building and the network of luminaires 102 can be used to track inventory, without the need for a remote server. Such computational tasks can be distributed over the network of luminaires 102 in order to more efficiently use each luminaire 102 in the network of luminaires 102, as discussed herein.

Figure 2:
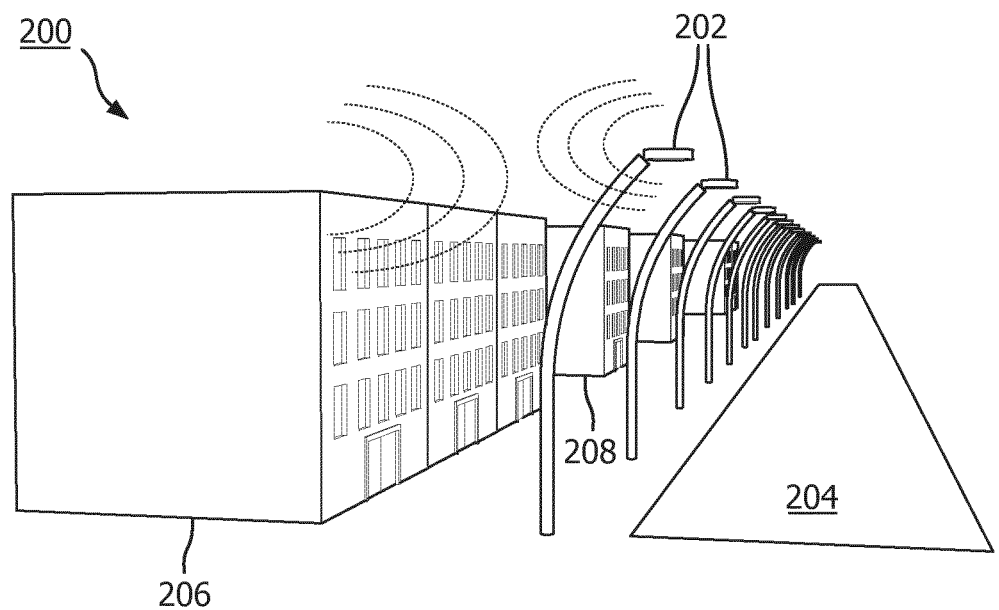
FIG. 2 illustrates an example of a network of luminaires connected outside of a building.

FIG. 2 illustrates a diagram 200 that provides an example of a network of luminaires 202 outside of a building 206. The network of luminaires 202 can be incorporated into street lights that extend over a street 204 outside of the building 206. The network of luminaires 202 can send and/or receive data from computers within the building 206 or outside the building 206. For example, the network of luminaires 202 can be tasked with tracking environmental changes outside of the building 206 and communicate data about the environmental changes to computers within the building 206. Such environmental changes can include detecting pollution, counting persons outside the building 206, detecting traffic conditions outside the building 206, detecting velocity of objects or persons outside, and/or detecting weather conditions outside the building 206. Data related to the environmental changes can be compressed by the network of luminaires 202 before the data is sent to the building. The data can be segmented and distributed to the other luminaires 202 on the street 204 for further processing, and thereafter transmitted back to the luminaire 202 that is closest to the building 206. The luminaire 202 closest to the building 206 can then send the data to the computer in the building 206.

In some embodiments, the network of luminaires 202 can communicate with personal devices of persons walking outside near the network of luminaires 202. The personal devices can employ the network of luminaires 202 with computational tasks in order to conserve energy and/or bandwidth of the personal devices. Such computational tasks can include compressing data before the data is sent over a long-term evolution (LTE) network. In some embodiments, a person's device can communicate with another person's device via the network of luminaires 202. For example, a first person with a first device in building 206 can typically use the internet or a cellular network to communicate with a second device of a second person in a neighboring building 208. However, in order to reduce amount of bandwidth used in the building 206 Wi-Fi or cellular network, the first device and the second device can connect to the network of luminaires 202 and communicate with each other over the network of luminaires 202.

Figure 3:
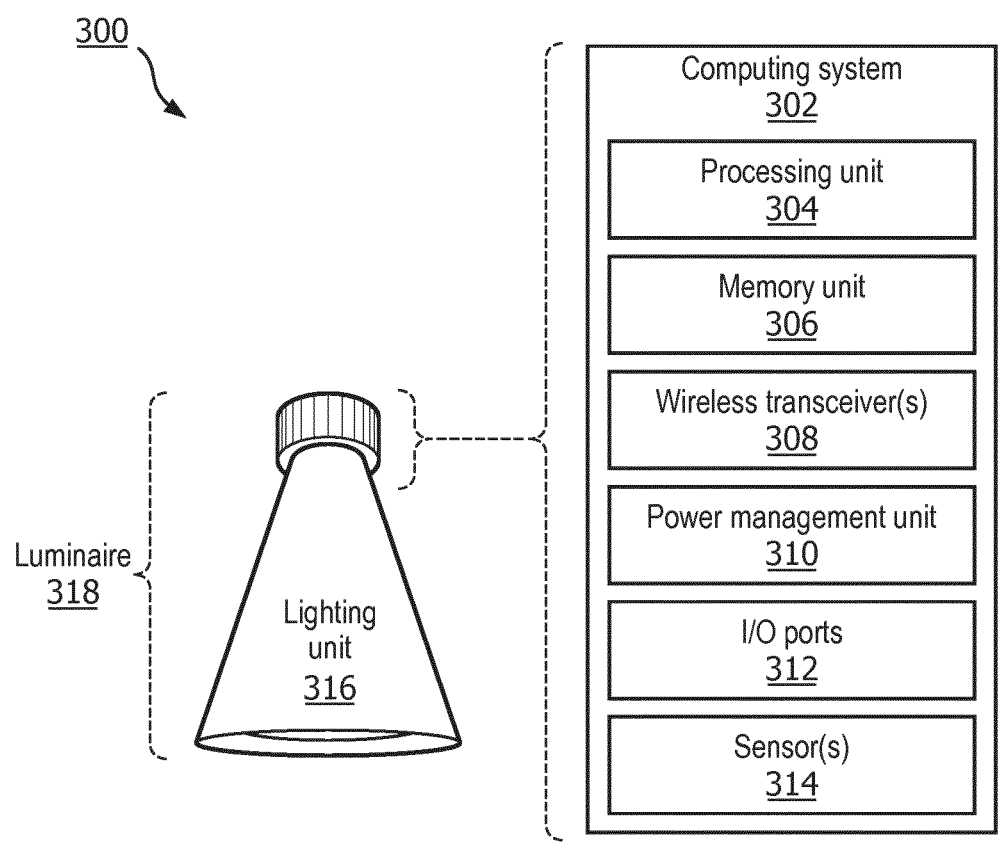
FIG. 3 provides a system diagram of a luminaire that can be included in any of the embodiments discussed herein.

FIG. 3 provides a system diagram 300 of a luminaire 318 that can be included in any of the embodiments discussed herein. The luminaire 318 can include a lighting unit 316, which can be any light source suitable for providing a light output. The luminaire 318 can also include a computer system 302. The computer system 302 can include a processing unit 304, which can include a central processing unit and/or a graphics processing unit for performing computational tasks on data received at the luminaire 318. The computer system 302 can also include a memory unit 306. The memory unit 306 can include one or more memory devices, including, but not limited to, random access memory (RAM) and/or read only memory (ROM). The memory unit 306 can store various data about the luminaire 318 as well as data related to any network that the luminaire 318 is connected. For example, the luminaire 318 can store network protocols for communicating with other luminaires 318 over a network, specifications related processing speeds and memory sizes for different luminaires 318 on the network, task schedules for different luminaries 318 on the network, bandwidth data for the network, and/or any other data suitable for improving the efficiency of the network.

The luminaire 318 can also include a wireless transceiver 308 for sending and receiving signals to and from other luminaires 318 on a network, or other devices. The wireless transceiver 308 can include one or more types of network interfaces for communicating with different types of devices. For example, the wireless transceiver 308 can include a near-field transceiver for communicating with other near-field devices. The wireless transceiver 308 can also include an extended range transceiver that is capable of communicating over a Wi-Fi or long term evolution (LTE) network. The wireless transceiver 308 can also include a wireless power transceiver for sending and receiving wireless power to and from other luminaires 318 respectively.

Additionally, the luminaire 318 can include a power management unit 310 for sending and receiving power. The power management unit 310 can receive power from a power source such as a battery or utility power supply and convert the received power for use by the lighting unit 316, computing system 302, and any other luminaires that can be connected to the luminaire 318. The power management unit 310 can also convert the received power for sending to other luminaires 318 in a network of luminaires 318.

The computing system 302 can also include input/output (I/O) ports 312 for connecting with other devices. For example, the I/O ports 312 can connect with optional sensors 314. The sensors 314 can include any type of sensor including, but not limited to, image, sound, chemical, electric, air, mechanical, force, pressure, heat, proximity, and/or any other type of sensor suitable for communicating signals in response to environmental changes. In this way, the luminaires 318 that include, or are connected to, sensors 314 can perform computational tasks that can improve the environment in which the luminaires 318 are exposed.

Figure 4A:
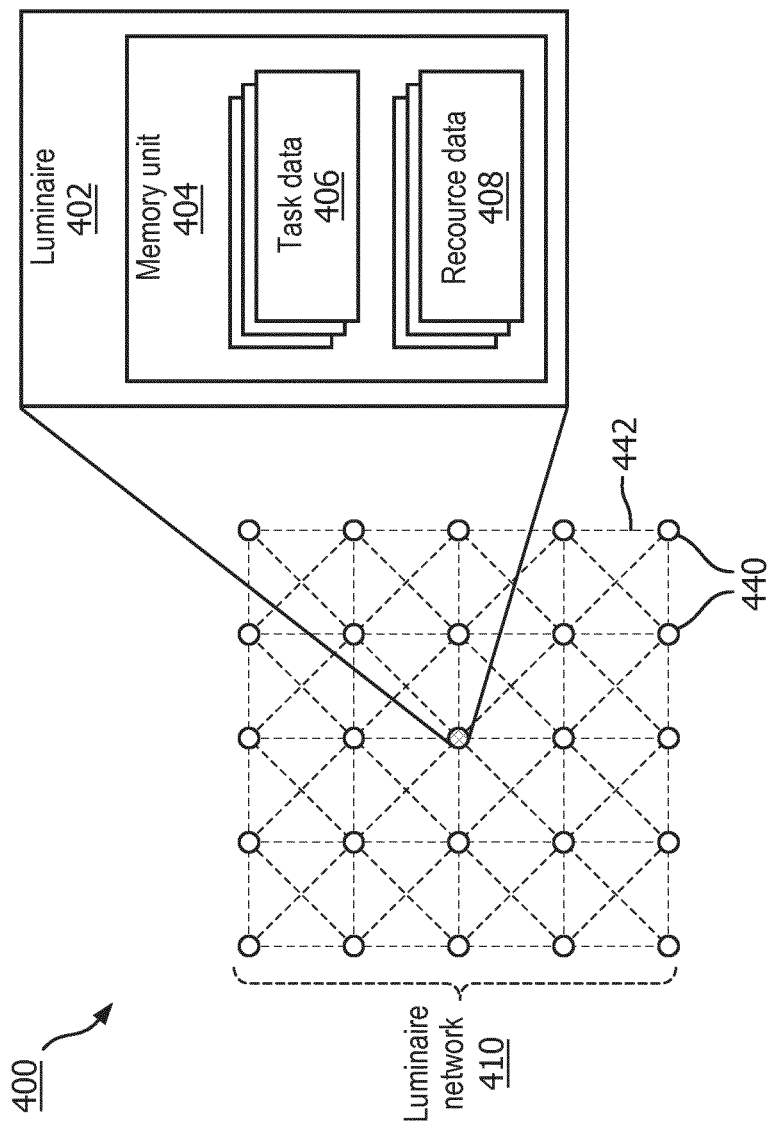
FIG. 4A illustrates a luminaire network that includes a reference luminaire with task data to be processed.

FIG. 4A illustrates a diagram 400 of a luminaire network 410 that includes a luminaire 402 with task data 406 for processing. The luminaire network 410 can include multiple interconnected nodes 430, where each node 430 represents a luminaire, such as the luminaires 102 illustrated in FIG. 1 or luminaires 202 of FIG. 2. Each node 430 can be connected through a wired and/or wireless connection 432 over which data, power, and/or any other signal can be transmitted. The luminaire 402 can include a memory unit 404, which can store task data 406 and resource data 408. The task data 406 can originate at the luminaire 402 or be transmitted to the luminaire 402 from an external source. For example, the task data 406 can be at least partially derived from a sensor that is part of the luminaire 402 or remote from the luminaire 402. The task data 406 can include segmented image data that has been segmented by a processor of the luminaire 402 so that the segmented image data can be distributed among other nodes 430 in the luminaire network 410 for additional processing.

The resource data 408 stored in the memory unit 404 of the luminaire 402 corresponds to computational resource data associated with the luminaire network 410. The resource data 408 can include a mapping of the nodes 430 in the luminaire network 410. The mapping can allow the luminaire 402 to make decisions about where to allocate certain computational tasks in the luminaire network 410 while minimizing the reduction in bandwidth by such allocations. For example, bandwidth can be more efficiently used by selecting nodes 430 that share the least connectivity requirement (i.e., number of connections 432) between the nodes 430 and the luminaire 402. Power can also be conserved by selecting a smaller number of nodes 430, or selecting nodes 430 that do not have previous commitments to perform computational tasks.

Figure 4B:
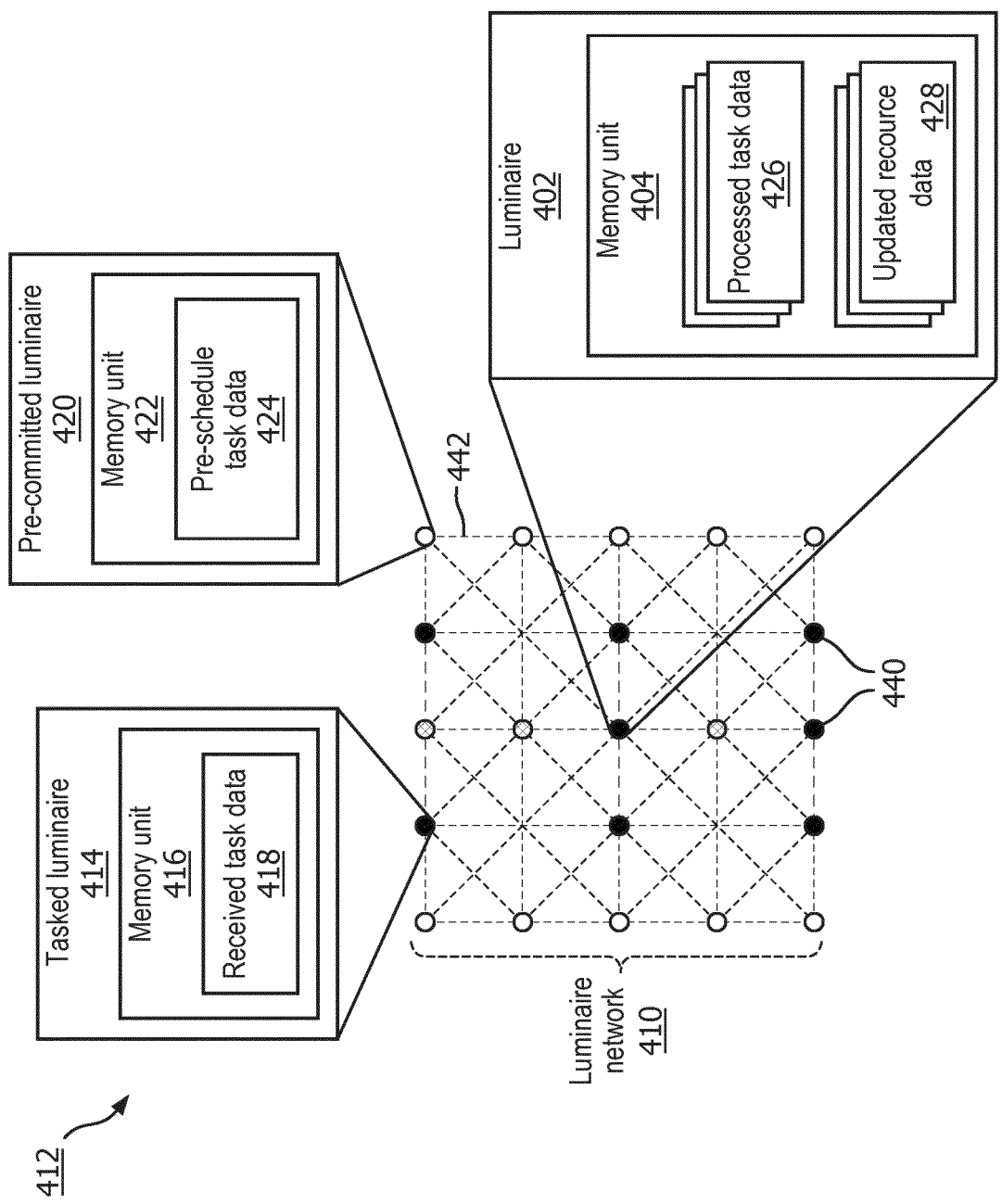
FIG. 4B illustrates a luminaire network where the task data has been distributed to certain nodes of the luminaire network for processing.

FIG. 4B illustrates a diagram 412 of the luminaire network 410 where the task data 406 has been distributed to certain nodes 430 for processing. The darkest node can be the luminaire 402, which originally included the task data 406, as described with respect to FIG. 4A. The next darkest nodes can be tasked luminaires 414, which can store the received task data 418 in their respective memory units 416. The received task data 418 can include data and/or instructions for performing a computational task. The lightest nodes can be pre-committed luminaires 420, which have pre-scheduled task data 424 in their respective memory units 422. In order to complete a computational task more efficiently, the luminaire 402 can avoid allocating tasks to pre-committed luminaires 420 because there may be idle luminaires that are available for taking on computational tasks. Once the received task data 418 has been processed by the tasked luminaire 414, the tasked luminaire 414 can transmit processed task data 426 back to the luminaire 402. In some embodiments, the processed task data 426 can be transmitted back to the luminaire 402 over the same route of nodes 430 through which the received task data 418 was transmitted. In other embodiments, a new route for the processed task data 426 can be determined by the tasked luminaire 414 based on updated resource data 428 received by tasked luminaire 414 from the luminaire 402, or generated by the tasked luminaire 414. For example, if a pre-committed luminaire 420 completes its pre-scheduled task before the tasked luminaire 414 completes its received task, the pre-committed luminaire 420 may be idle and therefore serve as a suitable node for routing data back to the luminaire 402. Once the luminaire 402 receives some or all of the processed task data 426 back from the tasked luminaires 414, the luminaire 402 can generate updated resource data 428 in order to be able to allocate future computational tasks to the node 430 in an efficient manner.

Figure 5:
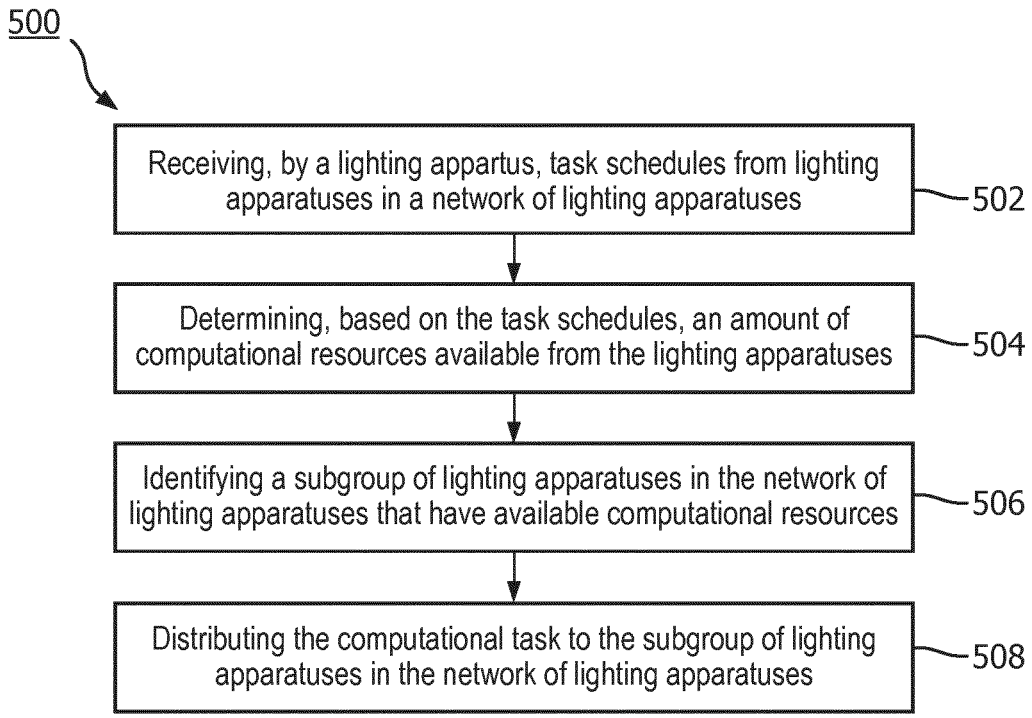
FIG. 5 illustrates a method for distributing computational asks over a network of lighting apparatuses, according to some embodiments.

FIG. 5 illustrates a method 500 for distributing computational tasks to a group of lighting apparatuses in a network of lighting apparatuses, according to some embodiments. The lighting apparatuses can correspond to any of the lighting apparatuses or luminaires discussed herein. As shown, the method 500 begins at step 502, where the lighting apparatus receives task schedules from lighting apparatuses in the network of lighting apparatuses. At step 504, the lighting apparatus determines, based on the task schedules, an amount of computational resources available from the lighting apparatuses. At step 506, the lighting apparatus identifies a subgroup of lighting apparatuses in the network of lighting apparatuses that have available computational resources. The lighting apparatus can determine availability of computational resources by comparing certain computational metrics to certain thresholds. For example, the lighting apparatus can use the task schedules to estimate the available RAM in each lighting apparatus in the network for performing the computational task. If the estimated amount of available RAM for a particular lighting apparatus is above a threshold, the particular lighting apparatus can be delegated part of the computation task. If the estimated amount of available RAM for the particular lighting apparatus is below the threshold, the particular lighting apparatus can be left to perform its pre-committed tasks in its task schedule. In some embodiments, the lighting apparatus can use task schedules to determine whether lighting apparatuses on the network are performing a task and how long the task will take complete before taking on another task. In this way, the lighting apparatus can select idle lighting apparatuses to perform certain computational tasks as well as select certain lighting apparatuses that have shorter tasks. At step 508, the lighting apparatus distributes the computational task to the subgroup of lighting apparatuses in the network of lighting apparatuses. The distribution of computational tasks can include sending data wirelessly between lighting apparatuses using wireless transceivers incorporated into the lighting apparatuses. Another example involves the distribution of a parallelizable computation task from one lighting apparatus or remote server, say originating resource, to a subgroup of lighting apparatuses. The lighting apparatus determines the optimal amount of adjoining or additional lighting apparatuses to pool in and distribute the tasks over. This can be based on network constraints on distributing the loads, topological constraints, nearness of the lighting apparatus to the point of delivering the computation results, current computation tasks on individual lighting apparatus, historical utilization of the individual lighting resources, non-criticality of the lighting apparatus amongst others. In some embodiments, a subgroup of lighting apparatuses can be isolated for security purposes in order to prevent tampering of data stored by the lighting apparatuses. Isolation of the subgroup can be performed by temporarily closing communications to the subgroup, encrypting data managed by the subgroup using a key stored by at least one of the lighting apparatuses in the subgroup, and/or any other method for isolating a device on a network.

Figure 6:
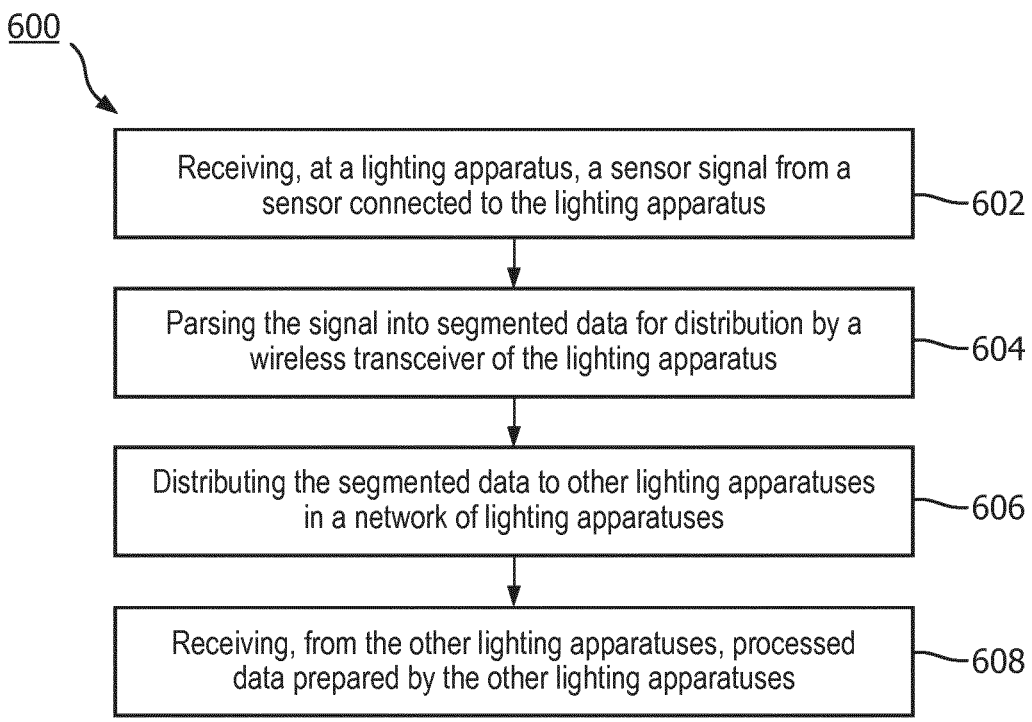
FIG. 6 illustrates a method for distributing and receiving segmented data to and from a network of lighting apparatuses for processing, according to some embodiments.

FIG. 6 illustrates a method 600 for distributing and receiving segmented data to and from a network of lighting apparatuses for processing, according to some embodiments. As shown, the method 600 begins at step 602, where the lighting apparatus receives a sensor signal from a sensor connected to the lighting apparatus. The sensor can include any of the sensors discussed herein and be directly or indirectly connected to the lighting apparatus. At step 604, the lighting apparatus parses the signal into segmented data for distribution over a communications channel of the lighting apparatus. At step 606, the lighting apparatus distributes the segmented data to other lighting apparatuses in a network of lighting apparatuses. Parsing the signal into segmented data can include converting the signal into data that is divided into segments. Parsing the signal data can also include filtering the signal to remove unwanted background data or noise, and dividing the filtered data into segments for analysis by the lighting apparatuses in the network. It should be noted that in some embodiments the parsing and/or filtering can be performed by multiple lighting apparatuses in the network. Moreover, the lighting apparatuses that perform the parsing can be different than the lighting apparatuses that perform the processing on the segmented data. In this way, the network of lighting apparatuses can more equally share the tasks of parsing and processing the segmented data. At step 608, the lighting apparatus receives, from the other lighting apparatuses, processed data prepared by the other lighting apparatuses.

Figure 7:
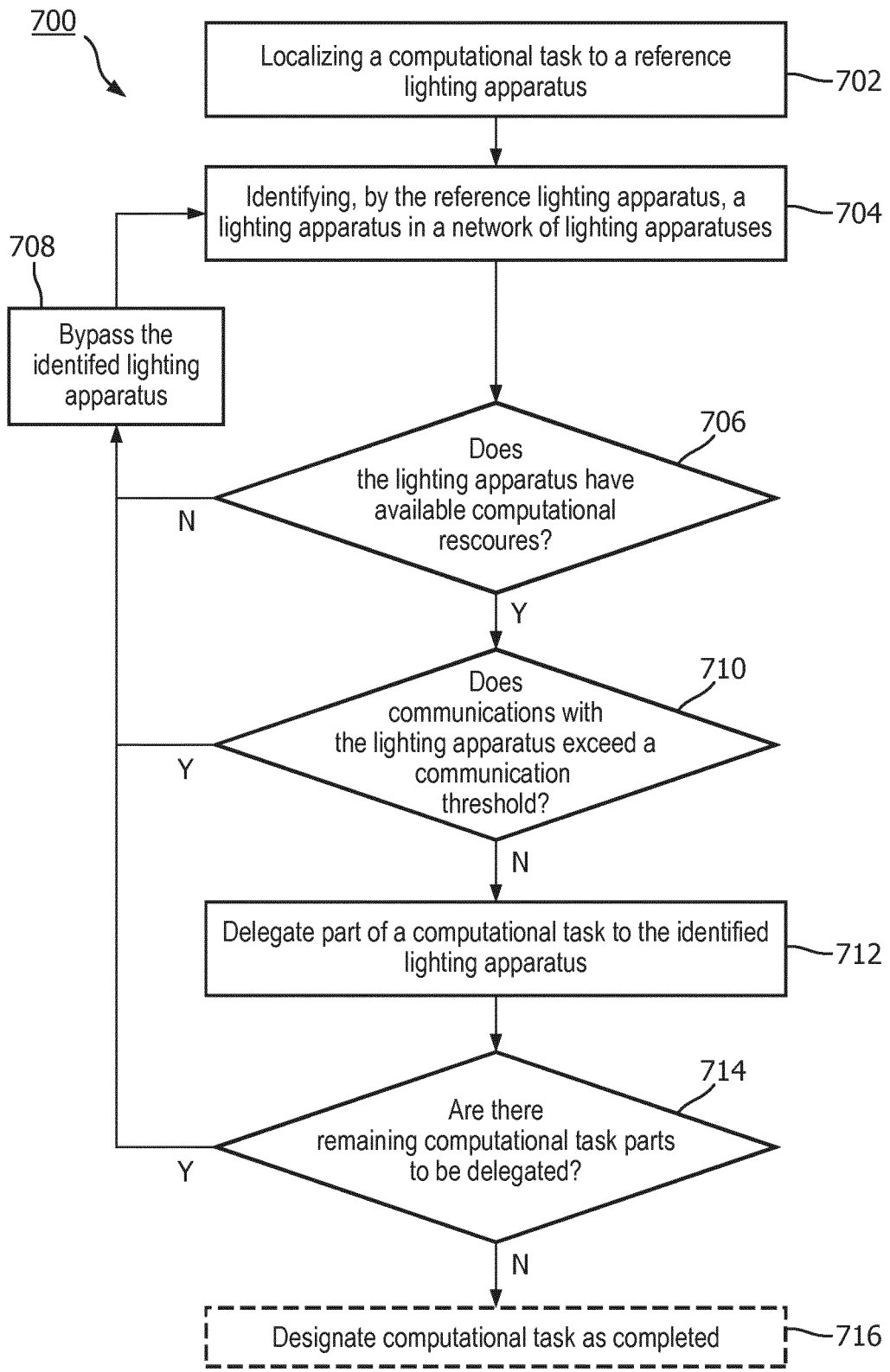
FIG. 7 illustrates a method for optimizing computational resources in a network of lighting devices, according to some embodiments.

FIG. 7 illustrates a method 700 for optimizing computational resources in a network of lighting devices, according to some embodiments. As shown, the method 700 begins at step 702, wherein a computational task is localized at a reference lighting apparatus. Localizing the computational task can include receiving, at the reference lighting apparatus, data corresponding to a computational task, or the lighting apparatus originating the computational task. At step 704, the reference lighting apparatus identifies a lighting apparatus in a network of lighting apparatuses. At step 706, the reference lighting apparatus determines whether the lighting apparatus has available computational resources. If, at step 706, the reference lighting apparatus determines that the identified lighting apparatus meets certain criteria, then the method 700 proceeds to step 710. These criteria can include but is not limited to: having currently available computational resources, future available computational resources, topological advantages over others, bandwidth transmission advantages over others, redundancy, nearest to point of load delivery, and other individual lighting or computational characteristics. Otherwise, the method 700 proceeds to step 708 where the identified lighting apparatus is bypassed and a different lighting apparatus is identified at step 704. At step 710, the reference lighting apparatus determines whether communication with the lighting apparatus exceed a communication threshold. The communication threshold can be based on an available bit rate for transmitting signals between the lighting apparatuses, available bandwidth between the lighting apparatuses, or an amount of time that the communication will take to reach its destination. If, at step 708, the reference lighting apparatus determines that the communication with the identified lighting apparatus does not exceed a communication threshold, or otherwise does not maximize or does not fit in optimal subset of apparatuses which maximize, the above mentioned criteria, then the method 700 proceeds to step 708. Otherwise, the method 700 proceeds to step 712. At step 712, the reference lighting apparatus delegates part of a computational task to the identified lighting apparatus.

At step 714, the reference lighting apparatus determines whether are there remaining computational task parts to be delegated. If, at step 714, the reference lighting apparatus determines that are there remaining computational task parts to be delegated, then the method 700 proceeds to step 708. Otherwise, at step 716, the reference lighting apparatus can optionally designate the computational task as completed. The completion of the computational task can be communicated to the other lighting apparatuses in the network, other local devices, and/or a remote server. For example, if the computational task was delegated to the reference lighting apparatus from another device, the reference lighting apparatus can transmit a signal to the other device indicating that the computational task has been completed. The reference lighting apparatus can also send any data derived from completing the computational task, for example, a compressed image or a summary of data.

Figure 8:
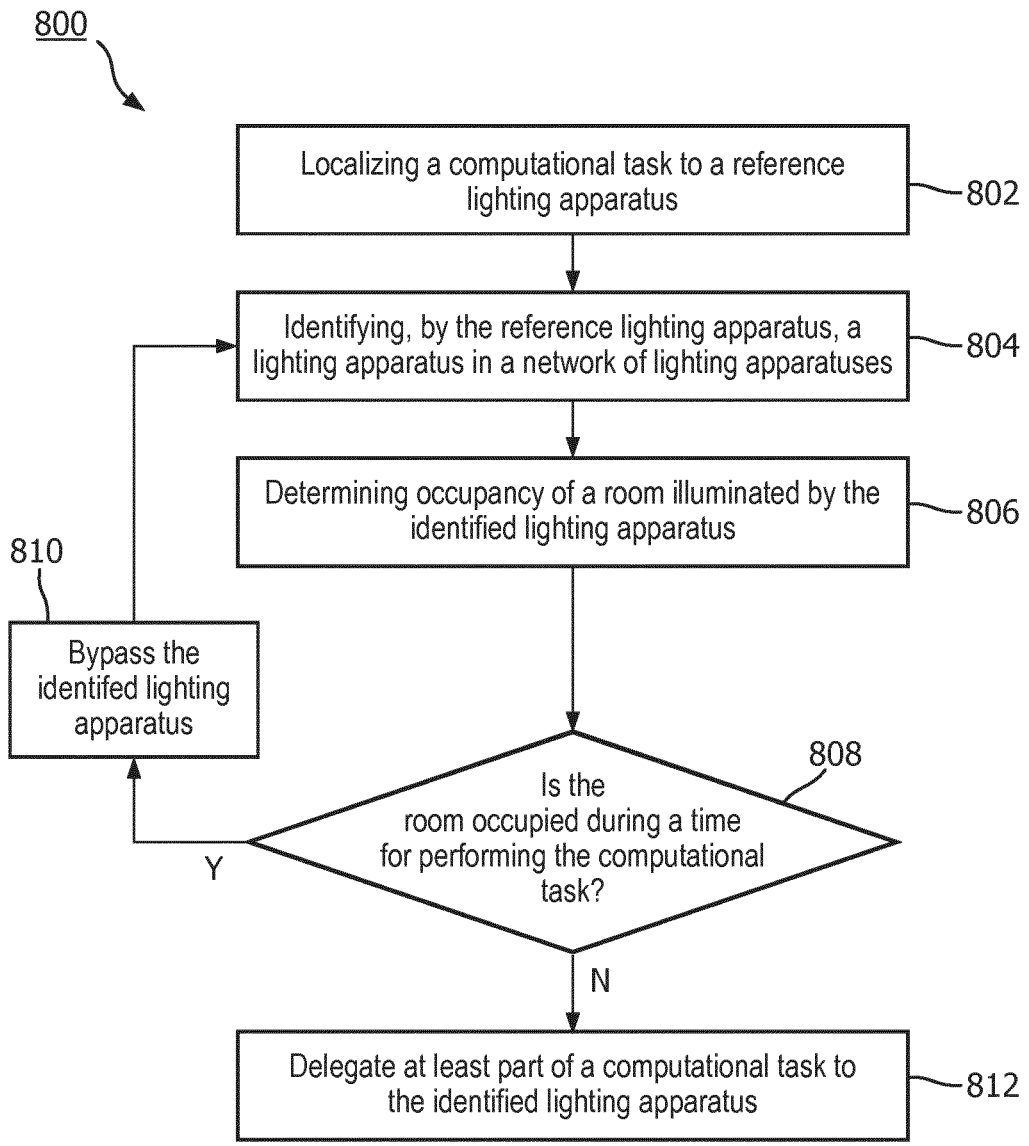
FIG. 8 illustrates a method for delegating computational tasks to lighting apparatuses according to whether the lighting apparatuses are located in an occupied room.

FIG. 8 illustrates a method 800 for delegating computational tasks to lighting apparatuses in a network of lighting apparatuses according to whether the lighting apparatuses are located in an occupied room. The method 800 can be performed by any apparatus, computing device, and/or lighting apparatus discussed herein. The method 800 can begin at step 802, where a computational task is localized to a reference lighting apparatus. At step 804, the reference lighting apparatus identifies a lighting apparatus in a network of lighting apparatuses. At step 806, the reference lighting apparatus can determine occupancy of a room illuminated by the identified lighting apparatus. Occupancy can refer to whether one or more persons of present inside of the room, and/or a count of the number of persons within the room. The reference lighting apparatus can determine occupancy using room schedules accessible to the reference lighting apparatus. For example, the reference lighting apparatus can download meeting schedules from devices located within the rooms of the building and/or from a personal computing device of someone who is participating in a meeting. In some embodiments, the reference lighting apparatus can determine occupancy by determining occupancy patterns of rooms in the building. Occupancy patterns can be determined using the various lighting apparatuses in the network of lighting apparatuses. The lighting apparatuses can be located in different rooms of the building and track when people are moving in and out of different rooms. By collecting data about the movement of people within the building and the different rooms, the lighting apparatuses can use the data to determine occupancy patterns for the different rooms as well as the entire building. At step 808, a determination is made as to whether the room is occupied during a time for performing the computational task. The time for performing the computational task can be the present time or a scheduled time in the future. If the room is occupied during the time for performing the computational task, the identified lighting apparatus can be bypassed at step 810, and a different lighting apparatus can be identified at step 804. If the room is not occupied during the time for performing the computational task, then, at step 812, at least part of the computational task can be delegated to the identified lighting apparatus.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03. It should be understood that certain expressions and reference signs used in the claims pursuant to Rule 6.2(b) of the Patent Cooperation Treaty ("PCT") do not limit the scope.

The invention claimed is:

1. A method for performing a computational task using a network of lighting apparatuses, the method comprising steps that include:
by a lighting apparatus in the network of lighting apparatuses:
receiving task schedules from lighting apparatuses in the network of lighting apparatuses;
determining, based on the task schedules, an amount of computational resources available from the lighting apparatuses;
determining an occupancy pattern of a room illuminated by at least one lighting apparatus in the network of lighting apparatuses;
identifying a subgroup of lighting apparatuses n the network of lighting apparatuses that have available computational resources, wherein identifying the subgroup of lighting apparatuses is at least partially based on the occupancy pattern of the room; and
distributing the computational task to the subgroup of lighting apparatuses in the network of lighting apparatuses.

2. The method of claim 1, wherein the occupancy pattern is determined using one or more cameras installed in one or more lighting apparatuses in the network of lighting apparatuses.

3. The method of claim 1, wherein the steps further include:
receiving energy usage data from the lighting apparatuses in the network of lighting apparatuses, wherein distributing the computational task to the subgroup is at least partially based on the received energy usage data.

4. The method of claim 1, wherein the steps further include:
determining a connectivity requirement for distributing the computational task to the subgroup of lighting apparatuses in the network of lighting apparatuses.

5. The method of claim 4, wherein the steps further include:
parsing the computational task into subtasks at least partially based on the connectivity requirement for distributing the computational task, wherein distributing the computational task includes distributing the subtasks;
determining that a fault has occurred at a subgroup lighting apparatus; and
redistributing a subtask from the subgroup lighting apparatus to a different subgroup lighting apparatus.

6. A non-transitory computer-readable medium configured to store instructions that when executed by one or more processors of a computing device, cause the computing device to perform steps that include:
receiving, from a lighting apparatus in a network of connected lighting apparatuses, charge data that indicates a battery charge level of the lighting apparatus;
identifying, at least partially based on the charge data received from the lighting apparatus, a subgroup of lighting apparatuses to perform a computational task;
parsing the computational task into subtasks to be performed by the subgroup of individual lighting apparatuses; and
transmitting, to the subgroup of individual lighting apparatuses, data corresponding to the subtasks.

7. The non-transitory computer-readable medium of claim 6, wherein the steps further include:
determining that the battery charge level is within a low threshold stored by the computing device, wherein the lighting apparatus is excluded from the subgroup based on the battery charge level being within the low threshold.

8. The non-transitory computer-readable medium of claim 7, wherein the steps further include:
causing at least one lighting apparatus in the network of lighting apparatuses to share battery charge data with the lighting apparatus excluded from the subgroup.

9. The non-transitory computer-readable medium of claim 6, wherein the steps further include:
determining that the computational task is complete;
receiving an updated battery charge level from the lighting apparatus; and
determining an amount of charge consumed by the lighting apparatus as a result of performing the task.

10. The non-transitory computer-readable medium of claim 6, wherein the steps further include:
collecting environmental data using a sensor of the computing device;

parsing the collected environmental data into subsets of collected data; and transmitting, to the individual lighting apparatuses, the subsets of collected data with the data corresponding to the subtasks.

11. The non-transitory computer-readable medium of claim 10, wherein the computational task includes determining whether motion has occurred in an environment illuminated by the network of connected lighting apparatuses.

* * * * *